United States Patent [19]

Reiner et al.

[11] Patent Number: 5,185,699
[45] Date of Patent: Feb. 9, 1993

[54] METHOD AND APPARATUS FOR MAINTAINING PLANT OPERATION PROCEDURES

[75] Inventors: Roger T. Reiner, Murrysville; David M. Frost, Plum Borough; Johnna M. Chicots, Franklin Park Borough; Diane S. Petras, Penn Twp., Westmoreland County; Susan V. Fanto, Plum Borough, all of Pa.

[73] Assignee: Westinghouse Electric Corp., Pittsburgh, Pa.

[21] Appl. No.: 466,102

[22] Filed: Jan. 16, 1990

[51] Int. Cl.⁵ ............................................. G06F 15/38
[52] U.S. Cl. .................................................. 364/419
[58] Field of Search ............... 364/419, 200 MS File, 364/900 MS File; 395/600

[56] References Cited

U.S. PATENT DOCUMENTS

| | | | |
|---|---|---|---|
| 4,370,707 | 1/1983 | Phillips et al. | 364/200 |
| 4,383,298 | 5/1983 | Huff et al. | 364/401 |
| 4,417,321 | 11/1983 | Change et al. | 364/900 |
| 4,481,603 | 11/1984 | McCaskill et al. | 364/900 |
| 4,897,782 | 1/1990 | Bennett et al. | 364/200 |
| 4,930,077 | 5/1990 | Fan | 364/419 |
| 4,945,475 | 7/1990 | Bruffey et al. | 364/200 |

OTHER PUBLICATIONS

"KMS: A Distributed Hypermedia System for Managing Knowledge in Organizations" by Akscyn et al. Jul. 1988 vol. 31 No. 7; Communication of the ACM.

Compro Brochure, 1984.

Primary Examiner—Roy N. Envall, Jr.
Assistant Examiner—Xuong Chung

[57] ABSTRACT

A procedure document is maintained by storing procedure records identifying each procedure in the document, step records describing the steps performed in each procedure and substep records for steps broken into substeps. Internal references in one step to another step are delimited so that when the step sequence of a procedure is changed the internal step references can be automatically modified to correspond to the change which is made. In addition, the steps and substeps may contain references to instrument and equipment and setpoints of, e.g., pressure, which are pertinent to the procedure. The procedure records may contain a number of columns indicator which indicates whether the steps and substeps of that procedure will use one column or two columns. Seperate files are maintained to provide cross-referencing for the instruments and equipment as well as the setpoints. A description of the setpoints is maintained in a separate file containing unique setpoint identifiers. Exit conditions in the steps and substeps to another step or substep are also delimited and stored in another file to provide cross-indexing of the exit conditions. Yet another file is maintained with cautions and notes which are desired to appear at particular points in the procedure. Regardless of whether the procedure has one or two columns, the cautions and notes are output using the full two-column width.

24 Claims, 5 Drawing Sheets

METHOD AND APPARATUS FOR MAINTAINING PLANT OPERATION PROCEDURES

BACKGROUND OF THE INVENTION

1. Field of the Invention

The present invention is directed to a method and apparatus for maintaining plant operation procedures and, more particularly, to a method and apparatus which simplifies the maintenance of procedures containing internal references to other steps, external references to equipment and setpoints and cautions and notes intermingled with the procedure steps.

2. Description of the Related Art

Many types of plants and complex equipment, such as nuclear reactors, chemical processing plants, etc., have extensive detailed procedures for their operation. In the case of nuclear reactors, the Nuclear Regulatory Commission requires the use of written emergency operating procedures (EOPs) which define step-by-step responses to specific conditions as indicated by instrumentation of the reactor and its support systems. From time to time, these procedures require modification as, e.g., instrumentation is added, additional conditions of concern are recognized, previously prepared procedures are found to be inadequate, etc. In addition, when a new plant or reactor is constructed, many of the procedures created for an existing plant or reactor can be used at the new location, but some modifications may be necessary. A similar situation exists when procedures developed at one plant are applied to an existing plant that is similar, but not identical.

At the present time, such procedures can be maintained on a word processor, an outlining program or a similar software product. However, none of these software products are specifically directed to the situation involved in maintaining plant operation procedures. Most of these types of software products typically are able to view the procedure in only one way, i.e., as a document. Supporting documents, such as cross-references to instrumentation, equipment and setpoints used in the procedures can be difficult or impossible to generate automatically. In addition, internal references to one step in another step are typically not automatically identified and corrected when the step sequence changes. Also, integration of graphical representations which are common in such procedures typically require manual operations.

SUMMARY OF THE INVENTION

An object of the present invention is to provide a method for automatically updating internal step references in a plant operation procedure.

Another object of the present invention is to automatically provide cross-referencing of items referenced in a procedure.

Yet another object of the present invention is to provide cross-referencing of exit conditions from an originating step to another step not following the originating step.

A further object of the present invention is to provide deviation reports indicating differences between an operation procedure and a model procedure.

The above objects are attained by providing a method for maintaining a document containing hierarchical levels, comprising the steps of: storing a number of records in document files with the records at each hierarchical level in a separate file, at least one record containing at least one reference to another record; editing the records stored in the preceding step; and resolving all references to other records when the editing includes a change in record sequence. Preferably, references to items are stored in separate item files by type of item. For example, references to instrumentation and equipment are stored in an instrumentation and equipment file and references to setpoints are stored in a setpoint reference file. In addition, a setpoint description file is preferably provided to describe each of the setpoints. Also, an exit condition file is preferably provided to store the location of all exit conditions from an originating step to another step.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
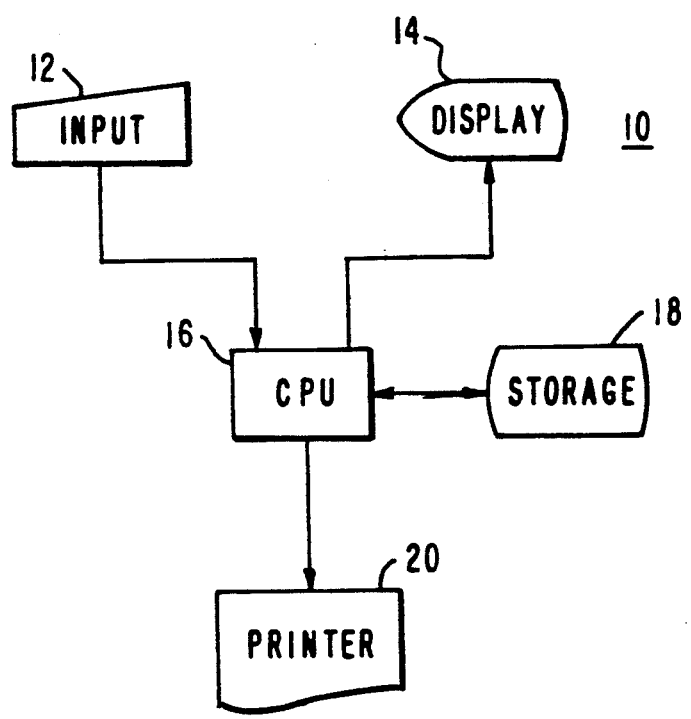
FIG. 1 is a block diagram of a computer system configured according to the present invention.

The present invention can be implemented using a conventional computer system, from a personal computer to a mainframe computer. As illustrated in FIG. 1, the computer system 10 should include at least an input device 12, such as a keyboard, for user input and a display unit 14, such as a conventional cathode ray tube (CRT) monitor. The input device 12 may also include a mouse, digitizing tablet, or optical scanner for inputting graphical information and a light pen or touch screen to simplify the user's control of a processor (CPU) 16 which executes programs that enable the computer system 10 to perform document maintenance according to the present invention.

A user of a computer system 10 programmed according to the present invention enters the text of documents and other information through the input device 12. This may be accomplished by typing or keying the information on a conventional keyboard, or scanning documents with an optical scanner and using character recognition software to convert the scanned image into strings of characters in a standard format, such as the American Standard Code for Information Interchange (ASCII). If the information is already in machine readable form, the input device 12 may be a tape or disk device or a connection to another computer with access to such a device. Once the text of a document is in machine readable form, the CPU 16 stores the information in storage unit 18. The stored text is maintained in the manner described below so that revised documents can be displayed on display unit 14 or printed by printer 20 to produce a permanent image on paper.

While the present invention can be applied to maintaining several different types of documents, it is particularly useful for maintaining step-by-step procedures, such as emergency operating procedures (EOPs) for a nuclear reactor. There are typically several procedures, each directed to a different situation. For example, one procedure may be directed to a steam generator tube rupture with loss of reactor coolant. Another procedure may be followed when a reactor trip or safety injection is first discovered. Yet another procedure may be invoked when coolant loss is detected without identifying a steam generator tube rupture.

Figure 2:
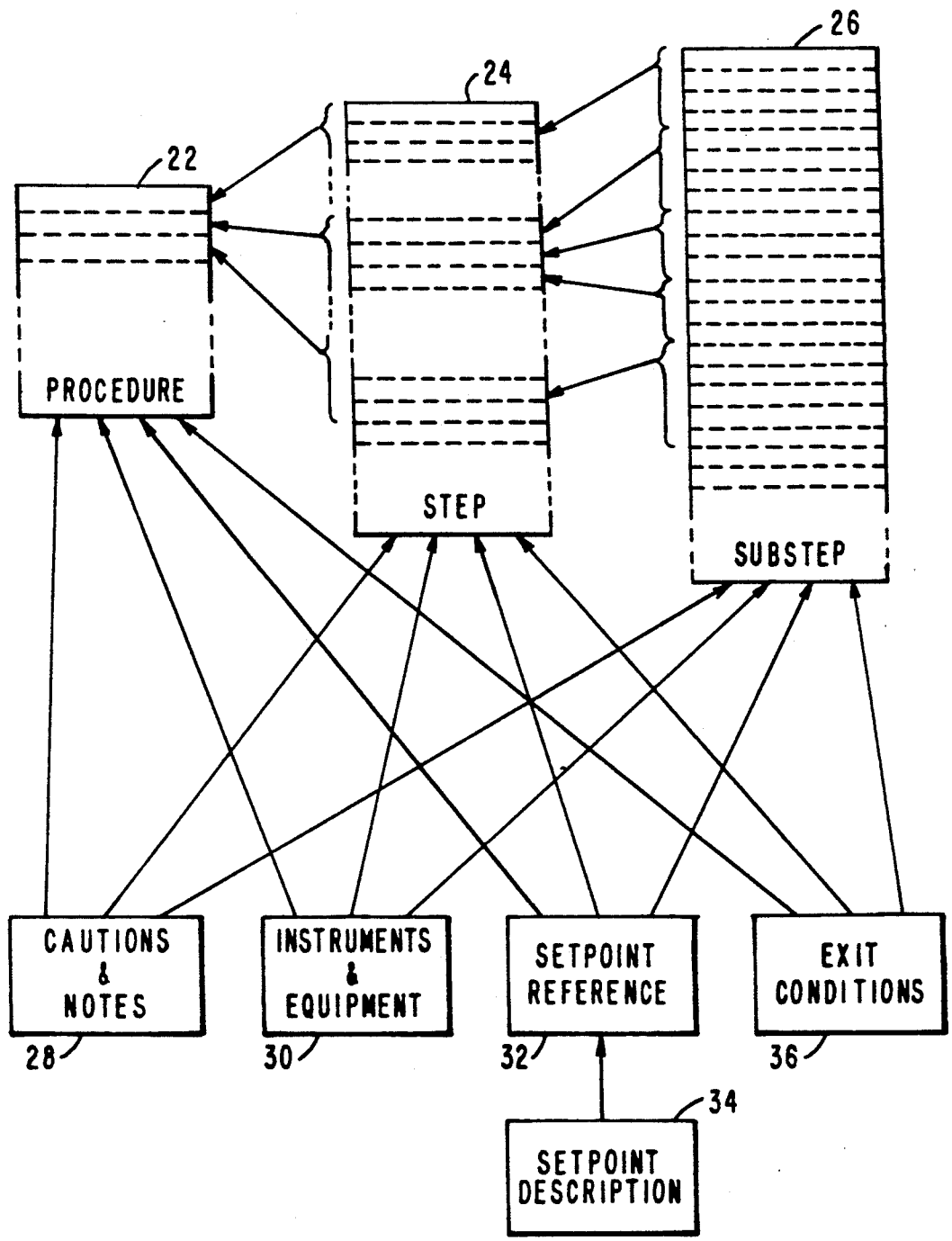
FIG. 2 is a block diagram of the primary files used by the present invention.

As illustrated in FIG. 2, the present invention stores a record for each procedure in a procedure file 22. A procedure record may include such information as a procedure identifier, the title of the procedure or a brief description of the procedure. Either or both of the title and description of the procedure may be included to provide text summarizing the procedure. Each procedure consists of one or more steps. Preferably, step records, each corresponding to a step in one of the procedures, are stored in a step file 24 separate from the procedure file 22. Each step record preferably contains a corresponding procedure identifier, a step identifier and space for a step description. The corresponding procedure identifier indicates that the step is part of the procedure described in the procedure file 22 having a procedure identifier which is the same as the corresponding procedure identifier of the step record.

Some procedures may be very simple and straight forward, that is, one step immediately follows another and there are no alternatives to completing each step. Such procedures are most efficiently output using substantially all of the output area with individual steps identified. Other procedures are more complex. In organizing the procedure, several substeps may be defined for each step. Preferably, the substeps are stored in a substep file 26 separate from the step 24 and procedure 22 files. Very complex procedures may have further hierarchial levels, with each hierarchial level preferably stored in a separate file and each lower level record including an identifier specifying an order within the hierarchial level associated with that file and other identifier(s) identifying a single record in each higher hierarchial level. For example, in a document having at most three hierarchial levels, as illustrated in FIG. 2, the substep records include a corresponding step identifier, the corresponding procedure identifier associated with the corresponding step identifier, a substep identifier and substep text.

Procedures for complex equipment, such as nuclear reactors, often include not only the action required, but also identify action to be performed if expected response is not obtained. Such procedures are preferably output according to the present invention in a two column format. The procedure record includes a columns indicator defining a number of columns to be used, so that simpler procedures can use the one column format described above, while more complex procedures can use a two column format where the text portion of the output has a space between the two columns. This form of procedure has a conventional format where the left hand text contains the action or expected response and the right hand text contains instructions to be performed if the response is not obtained. In this conventional format, the step number appears to the left of the left hand column of the text.

The hierarchial arrangement of the procedure, step and substep files is indicated in FIG. 2 by pointers (corresponding identifiers) from the records in the substep file 26 to records in the step file 24 and from the records in the step file 24 to the records in the procedure file 22. As indicated most clearly in the substep file 26, preferably there is no preset number of substeps. The braces indicate the separation of groups of substep records, each group containing substep record. Furthermore, as indicated in FIG. 2, each step record does not necessarily have a set of substep records corresponding thereto, even within a single procedure. While some procedures may have substeps for each of the steps, others may have none.

The method according to the present invention provides additional flexibility. In conventional emergency operating procedures, cautions and notes are inserted at certain points during the procedure to remind the operator of certain conditions which need to be checked or maintained or to provide instructions which apply during several steps. In the present invention, text of this sort is stored in a cautions and notes file 28, separate from the procedure, step and substep files. The cautions and notes file 28 preferably contains notation records, each referencing one of the procedure records and one of the step records using the procedure identifier and step identifier thereof, respectively, and notation text containing a caution or note to the corresponding step of the procedure. Upon output of the step referenced by the corresponding step identifier in a notation record, the notation text is output before the step text, whether the text is contained in the step file 24 or the substep file 26. Preferably, all of the notes use the one column format and are output in such a way as to call attention to the user. For example, hard copy output may use a different font, such as italics, and if available, the output can be in different colors on paper or the display unit 14, or reverse video or bold can be used on the display 14 for cautions and notes.

Typically, when the procedures for operating a plant are complex and there are several plants of similar design, a model procedure is developed which can be applied with modification to several different plants. According to the present invention, the step records preferably include space for a corresponding model step number of a model procedure and space for an explanation of deviation from the corresponding model step number. This allows a deviation report to be generated upon request to indicate differences between a procedure and the model procedure using the corresponding model step number and the explanation of deviation stored in the step records.

Other types of reports are also desirable and specific measures may be taken to generate such reports automatically. For example, the instrumentation and equipment used in the procedures may be assigned an equipment identifier which is unique for each instrument or piece of equipment. An equipment file 30, separate from the document files 22, 24, 26 and 28, may be used to store the equipment identifier and the procedure identifier, the step identifier and, if applicable, the substep identifier of one of the step and substep records referencing the equipment identifier therein. Similarly, procedures for operating many types of plants, including nuclear reactors, typically contain instructions regarding action to be taken at certain pressure setpoints.

As in the case of the instrumentation and equipment, preferably setpoint records are stored in a separate setpoint reference file 32. Each setpoint reference record contains a setpoint identifier and the procedure identifier, the step identifier and, if applicable, the substep identifier, of one of the step and substep records referencing the setpoint identifier therein. The setpoint reference file 32 may be used to generate a report indicating records in the document files 22, 24 and 26 containing references to setpoints. In the preferred embodiment, a separate setpoint description file 34 contains setpoint identifiers and a description of the setpoint corresponding to each setpoint identifier. The setpoint identifiers in the setpoint description file 34 have a unique value within the file, so that each setpoint is described only once.

When the present invention is applied to other types of procedures, other items may also be identified in the steps or substeps of a procedure. Preferably, records containing information on the items are stored in an item file separate from the document files. The item file may include different types of items, or separate item files may be used for each type of item as described above with respect to equipment and setpoints.

As noted above, the operation of a plant may be divided into separate procedures for different circumstances. In the case of a nuclear reactor, initially it may only be known that a loss of coolant has occurred. During the course of the procedure directed to loss of coolant, the cause of the loss, e.g., a steam generator tube rupture, may be identified. At this point in the procedure the operator may be instructed to change to a different procedure, i.e., the procedure for steam generator tube rupture with loss of reactor coolant. Similarly, procedures are typically not continuously sequential, but include branching where if one condition exists the following steps are performed and if a different condition exists steps elsewhere in the procedure are performed. An instruction to go to a different procedure or to go to a different sequence of steps will be termed an exit condition.

Preferably, exit conditions are identified and stored in a separate exit condition file 36. Each exit condition record preferably contains the exit condition and the procedure identifier, the step identifier and, if applicable, the substep identifier, of one of the step and substep records referencing the exit condition therein. The exit conditions file 36 can then be used to produce a report upon request listing the steps and substeps containing definitions of the conditions for interrupting.

In the preferred embodiment, delimiters are used in the text of the steps and substeps to identify the exit conditions, the equipment identifiers and the setpoint identifiers. The user inputs different delimiters for each and when the CPU 16 detects a delimiter, the procedure identifier, step identifier and, if applicable, substep identifier, together with the delimited text, are stored in the appropriate file. For example, a first delimiter set, such as braces or curly brackets "{ }", may be used for procedure exit conditions; a second delimiter set, such as the at sign "@", may be used to indicate that an instrumentation or equipment identifier has been entered between the at signs and a third delimiter set, such as angled brackets (less than and greater than signs) "< >", may be used to indicate that a setpoint identifier has been entered between the delimiters. This enables the user to input data in free-form text while storing the information in a structured fashion enabling reports to be easily generated automatically.

Preferably, a fourth delimiter set, such as square brackets "[]" or circumflexes "-", is used to indicate that an internal step reference has been input. This is distinguished from an exit condition which instructs the user to go to a different step, possibly in a different procedure, when certain conditions exist. The internal step reference may be used to refer back to a reading taken or a procedure previously performed, etc. As described below, delimiting internal step references enables a system programmed according to the present invention to automatically correct the internal step references when a step of a procedure is added or deleted.

Figure 3:
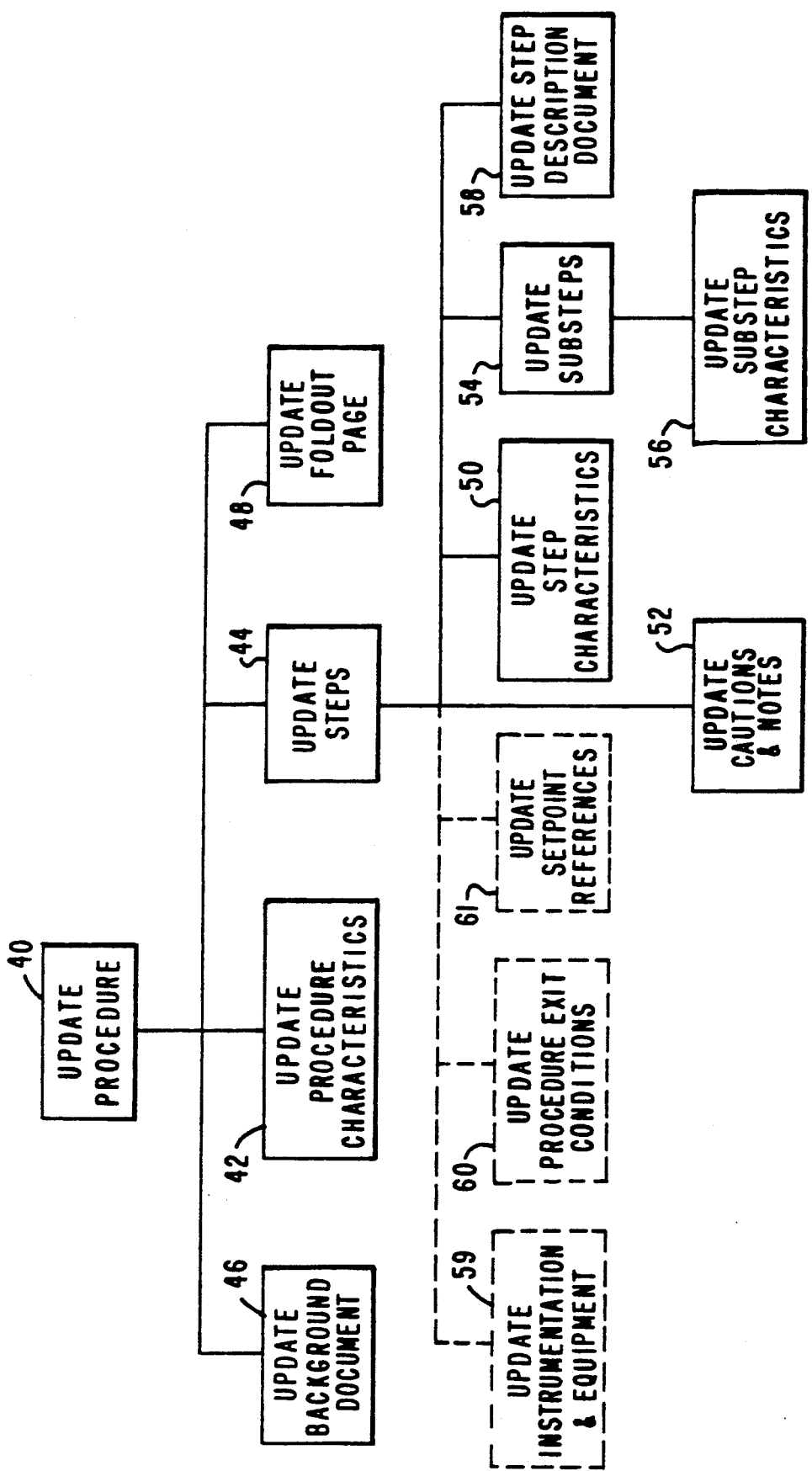
FIG. 3 is a hierarchial diagram of processing performed in the present invention.

Once a procedure has been input and stored in the files illustrated in FIG. 2, the procedure can be maintained by editing the records stored in the files. In the preferred embodiment of the present invention, the user maneuvers through a series of screens to perform the editing. FIG. 3 illustrates the screens hierarchically. The user is first presented with an update procedure screen 40 which requests the user to input which procedure is to be edited. After identifying the procedure, the user indicates whether the procedure characteristics are to be updated 42, or the steps of the procedure are to be updated 44. Other information, in files not illustrated in FIG. 2, may also be updated, such as a background document 46 or foldout page 48. These documents may be maintained using a conventional word processor, or the file structure described above may be modified to include these documents as part of the procedure record. Update of the procedure characteristics 42 includes editing such items as the title of the procedure, the brief description of the purpose of the procedure, etc.

If the user chooses to update steps 44, the user is presented with several options, including the update of step characteristics 50, cautions and notes 52 or substeps 54. If the user wishes to update the substeps 54, a separate screen is brought up to update the substep characteristics 56. An additional option is to update the step description document 58 which is similar to the background document updated in screen 46 and which can be stored in a separate file edited with a word processor, or stored as part of the step record. As indicated in FIG. 3 by the use of dashed lines, ordinarily the instrumentation and equipment file 30, setpoint reference file 32 and procedure exit conditions file 36 are automatically updated upon editing a step or substep. However, an alternative embodiment is to provide for direct editing of these files in separate update screens 59, 60 and 61.

Figure 4:
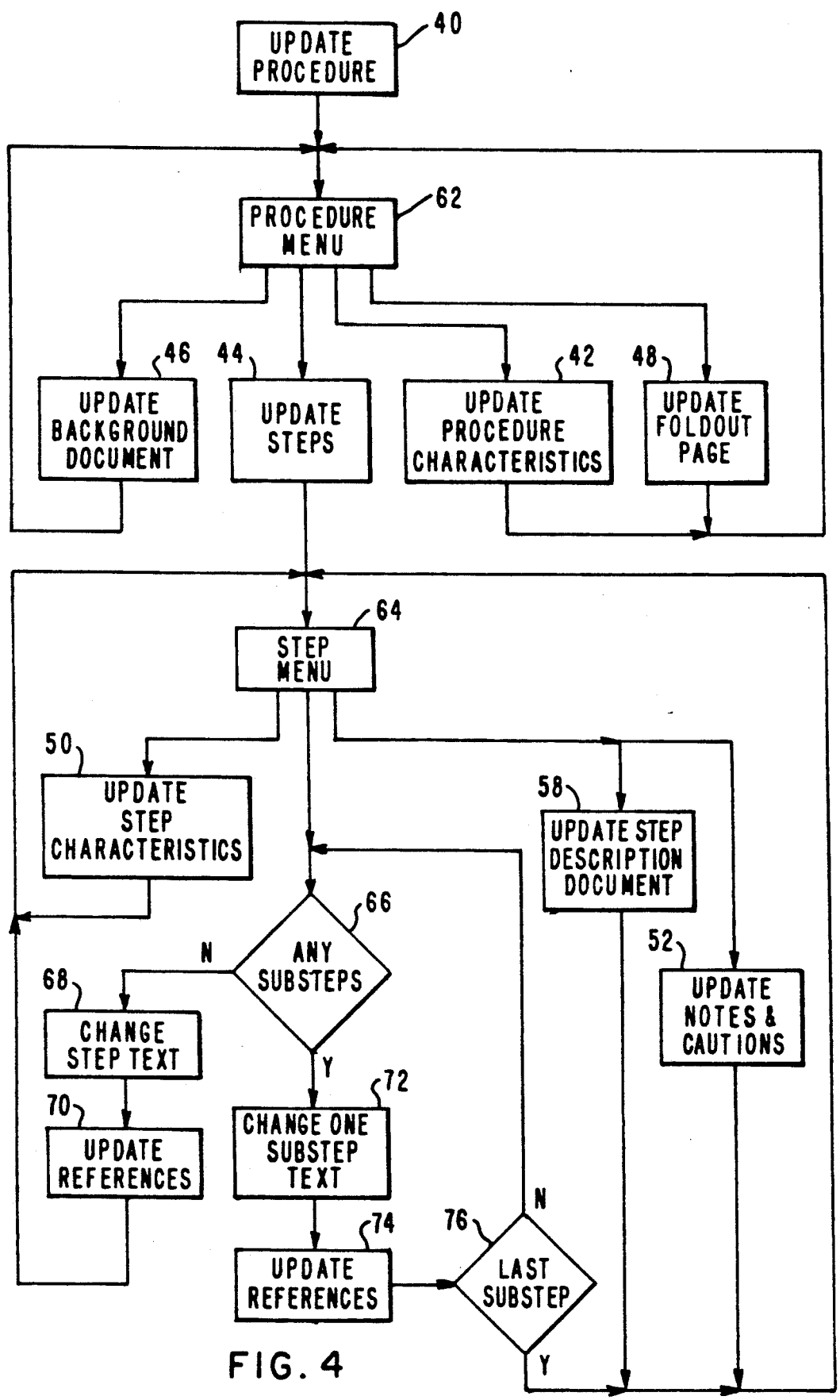
FIG. 4 is a flowchart of the procedure followed in updating a document according to the present invention.

A flowchart illustrating how changes are made to a procedure or step is illustrated in FIG. 4. When the update procedure screen 40 is entered, a procedure menu 62 is displayed to prompt the user to select what is to be updated. According to the user's response, the system transfers control to a word processor to update the background document 46 or foldout page 48, displays one or more screens to allow the user to update the procedure characteristics 42, or begins processing to update steps 44.

When the user wishes to update the steps 44, the system 10 responds by displaying a step menu 64. From the step menu 64, the user may choose to update the step characteristics 50, update the step description document 58 or update notes and cautions 52. If none of these options are chosen, the user may make changes to the text of a step.

When the user inputs a step identifier for step text which is to be updated, the system 10 determines 66 whether there are substeps to the step. If there are no substeps, a screen is displayed of the step text to allow the user to make changes 68. When the user has completed making changes to the text of the step, the system resolves all references to other records if the changes 68 to the step text results in a change in record sequence. For example, the updating of references 70 when a step is added includes automatically incrementing the step identifier of all of the step records containing the corresponding procedure identifier and following the step record which was added. In addition, the system automatically increments the step identifier in the internal references to all of the step records having step identifiers which were incremented. Similarly, when one of the steps is deleted in the changes made to the step text 68, updating references 70 includes automatically decrementing the step identifier of all of the step records containing the corresponding procedure identifier and following the step record which was deleted. In addition, the system automatically decrements the step identifier in the internal references to all of the step records having step identifiers which were decremented. This updating is possible due to the delimiting of internal step references.

In addition to updating the internal step references, the references updated 70 include the records stored in the instruments and equipment file 30, setpoint reference file 32 and exit conditions file 36, if any changes were made which would affect these records. During the updating of references 70, the edited step record is scanned for changes in the references to the instruments and equipment. For example, if a reference to instrument(s) or equipment is deleted from the step, the record will be deleted from the instruments and equipment file 30. Similarly, if the equipment identifier is changed, the system will make a change in the corresponding record in the instruments and equipment file 30 to change the equipment identifier stored therein.

The updating of references 70 also includes scanning of records for changes in the setpoint(s) and the definitions of conditions for interrupting. Similar changes to those described above with respect to instrumentation and equipment are made to the setpoint reference file 32 and exit conditions file 36 if the system detects changes which would affect these files. Thus, if a step containing a reference to one of these files is edited in step 68, whether the step itself is completely deleted, or merely the reference is deleted, the corresponding record in the setpoint reference file 32 or exit conditions file 36 is deleted.

If the test for substeps 66 determines that the step contains substeps, a loop is entered in which one substep at a time is changed 72 and after editing of the substep is completed, references are updated 74. This process is repeated for each substep until the last substep 76 has been edited. The changes made to the substeps 72 and the process of updating the references 74 is essentially the same as that described above for individual steps which do not contain substeps.

Alternatively, all of the substeps of a step may be edited prior to updating the references. In this case, the block indicating update to references 74 would be deleted and the test for last substep would route processing to update the references 70 when the last substep is detected. Similarly, several steps could be edited in a procedure or in several procedures prior to updating the references. In the preferred embodiment, the updating is performed immediately upon receipt of the changes, so that the user does not have to wait for a noticeable period of time while the references are updated in a complex procedure in which several changes have been made. This method also simplifies the process of updating the references, since only a small section of text has to be scanned for changes and a large space for recording the changes made does not have to be provided.

Figure 5:
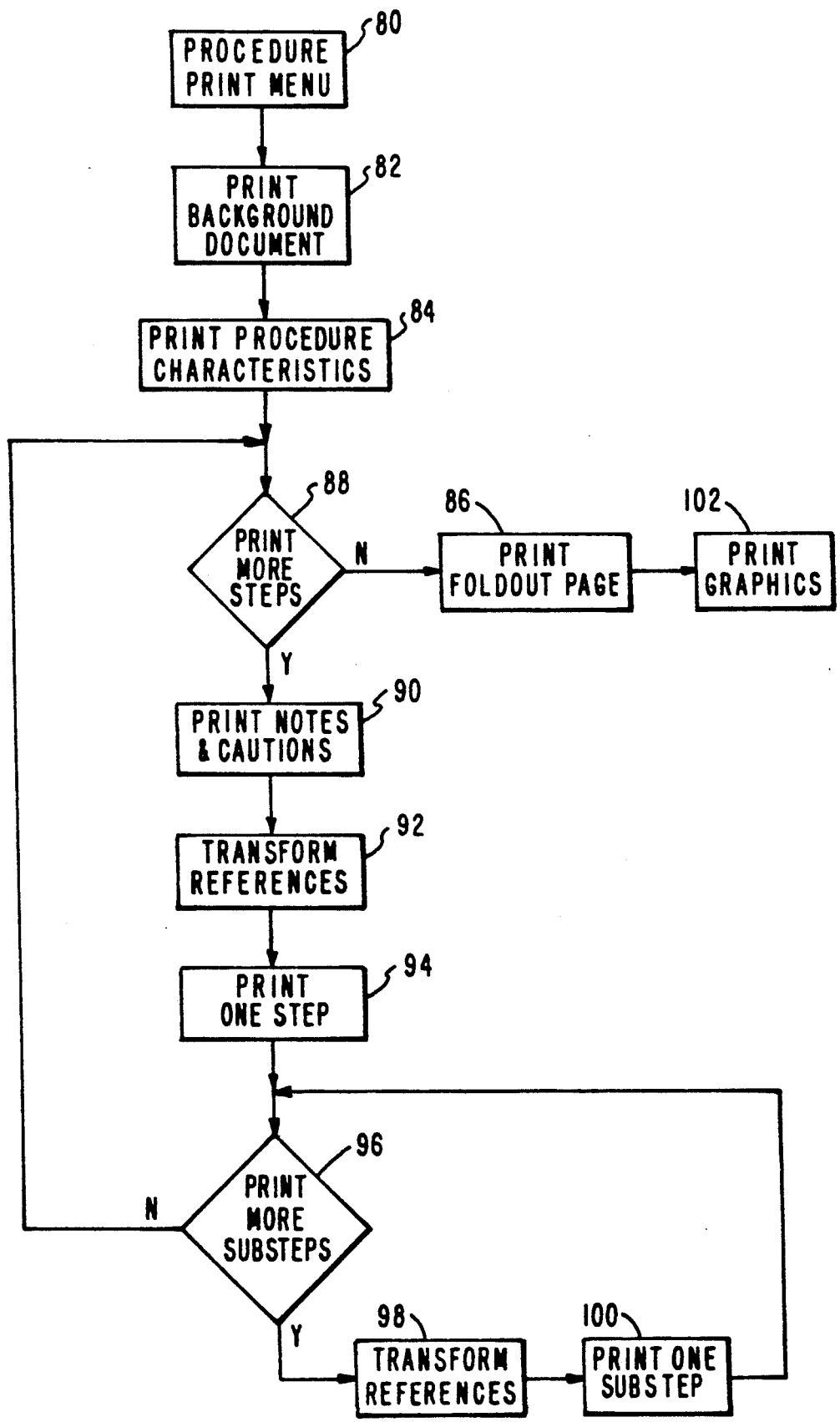
FIG. 5 is a flowchart printing a procedure according to the present invention.

After a document has been edited, or at any time, whether changes have been made or not, the document or a portion of the document can be printed or otherwise output to the user. If one or part of one procedure is to be output, the system follows the flow illustrated in FIG. 5. The procedure print menu 80 prompts the user to identify what is to be printed. After receiving the user's response, the system will print the background document 82, if requested. Next, the procedure characteristics will be printed 84, if requested. As noted above, the procedure characteristics include such information as the title of the procedure and a brief description of the procedure. If the actual steps have not been requested for printing or after the steps have been printed as described below, the system will print the foldout page 86, if requested. The foldout page contains information which is ordinarily made available to the reader of a procedure throughout the procedure and is implemented in a hard copy system by a page which folds out so that as the pages in the procedure are turned, the foldout page can still be read. This distinguishes the foldout page from the cautions and notes which appear on one page and can no longer be viewed after the page is turned, even though the caution or note may still apply.

The user may specify the number of steps to be printed. A single step, a range of steps, starting and ending at any point, or all of the steps may be printed. Assuming at least one step is to be printed, the test for more steps to be printed 88 will initially be true. If there are any notes or cautions associated with a step, the cautions and notes are output 90 for the step referenced by the corresponding step identifier stored in the cautions and notes file 28.

In the preferred embodiment, references to setpoints, for example, may use the setpoint identifier in the step or substep text. The actual setpoint information is retrieved from the setpoint description file 34 in the process of transforming references 92. If the text of the step is included in the step record, it is printed 94 and no substeps will be detected 96, so processing will return to the test for more steps 88. If the text of a step is stored in substep records, references are transformed 98 and each substep is printed 100 until no more substeps are found 96 for the current step.

In addition to the procedure documents, other information can be output. For example, a report indicating any use of the instruments and equipment in activities described in a corresponding record in the document files can be output upon request using the instruments and equipment file 30. Similarly, a cross reference listing of the references to setpoints can be output upon request, or a setpoint description report describing at least some of the setpoints used with the instruments and equipment referenced in the document files can be output.

In some cases, it is desirable to include a graph or other drawing for reference. For example, a graph of pressure versus flow, or a diagram of the plant or a portion of the plant may be included as part of a procedure. As noted above, the input device 12 may include an optical scanner, mouse or digitizing tablet for the purpose of inputting such graphical representations which can be stored as data in a graphics file (not shown). Preferably, a reference to an associated graphics file is stored in a step record and when that step record is output, the graphical representation of data stored in the graphics file is automatically output 102. Preferably, this is accomplished by storing a list of graphics files to be output as the steps containing references to graphics files are printed 94, and subsequently printing the graphic image(s) based on the graphic representation. Alternatively, the graphic image(s) can be output after the corresponding step, on the same page or a following page.

The above description of outputting has primarily been directed to the situation of producing a permanent image on, e.g., paper. However, the procedure is essentially the same if the information which would be printed is displayed on a screen, one screen full (page) at a time, or stored in a disk or tape file for later reference.

The many features and advantages of the present invention are apparent from the detailed specification, and thus, it is intended by the appended claims to cover all such features and advantages of the method which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

What is claimed is:

1. A method for maintaining in a machine-readable form a document containing hierarchical levels, comprising the steps of:
    (a) storing a number of records in document files with the records at each hierarchical level in a separate file, at least one record containing at least one reference to another record, including the substeps of;
        (a1) storing at least one record, each identifying a procedure, in a procedure file included in the document files;
        (a2) storing a plurality of the records in a step file included in the document files, each of the records in the step file referencing one of the records in the procedure file and describing a step in a step sequence of the procedure referenced therein; and
        (a3) storing a plurality of the records in a substep file included in the document files, each of the records in the substep file referencing one of the records in the step file and describing a substep in a substep sequence of the step referenced therein;
    (b) editing the records stored in step (a); and
    (c) resolving all references to other records automatically when said editing includes a change in record sequence.

2. A method as recited in claim 1,
    wherein said storing in step (a) includes storing references to items as part of at least one of the records in the document files, and
    wherein said method further comprises the step of (d) storing records containing information on the items in an item file separate from the document files.

3. A method as recited in claim 2,
    wherein said storing in step (d) includes storing records identifying instruments and equipment as the items, and
    wherein sad method further comprises the steps of:
        (e) scanning records edited in step (b) for changes in the references to the instruments and equipment; and
        (f) modifying the records store din step (d) in dependence upon changes in the references to the instruments and equipment detected by said scanning in step (e).

4. A method as recited in claim 2,
    wherein said storing in step (a) includes specifying, in each of the records in the document files, an order within the hierarchical level, and associated with each file and identifying a single record in each higher hierarchical level, and
    wherein said storing in step (d) includes identifying each record containing one of the references to one of the items.

5. A method as recited in claim 2,
    wherein said editing in step (b) is permitted to include inserting and deleting records, and
    wherein steps (c) and (d) are performed after completing said editing of each of the records edited in step (b).

6. A method as recited in claim 2,
    wherein each of the records in the document file describe at least one activity, and
    wherein said method further comprises the steps of:
        (e) outputting, upon request, at least a portion of the document in dependence upon the records stored in step (a) as edited in step (b); and
        (f) outputting, upon request, a report indicating any use of the instruments and equipment in the at least one activity described in a corresponding record in the document files.

7. A method as recited in claim 2,
    wherein said storing in step (d) includes storing records identifying instruments and equipment as the items,
    wherein at least one of the records stored in step (a) includes a setpoint used with one of the instruments and equipment, and
    wherein said method further comprises the step of (e) storing records containing document file identifiers and setpoint identifiers in a setpoint reference file separate from the document files.

8. A method as recite din claim 7, further comprising the steps of:
    (f) scanning each record, after editing thereof is completed in step (b), for changes in the setpoint stored in the at least one of the records; and
    (g) modifying the records stored in step (e) in dependence upon changes detected by said scanning in step (f) and any changes in the record sequence of the document files due to addition and deletion of records.

9. A method as recite in claim 1,
    wherein at least one of the records stored in steps (a1)-(a3) includes a definition of conditions for interrupting at least one of the step and substep sequences, and
    wherein said method further comprises the step of (d) storing records containing document file identifiers and exit condition identifiers in an exit condition reference file separate from the document files.

10. A method as recited in claim 9, further comprising the steps of:
(e) scanning each record, after editing thereof is completed in step (b), for changes in the definition of conditions for interrupting; and
(f) modifying the records stored in step (d) in dependence upon changes detected by said scanning in step (e) and any changes in the step and substep sequences due to addition and deletion of records.

11. A method as recited in claim 9,
wherein said storing in step (a2) includes specifying a procedure number for the procedure referenced therein and a step number indicating the step sequence of the procedure,
wherein said storing in step (a3) includes specifying the procedure and step numbers corresponding thereto and a substep number indicating the substep sequence, and
wherein said storing in step (d) includes storing the procedure number and the step number, and when the conditions for interrupting are defined in one of the records in the substep file, the substep number, corresponding thereto.

12. A method as recited in claim 9, further comprising the steps of:
(e) outputting, upon request, at least one step, including substeps, represented by one of the records in the step file; and
(f) outputting, upon request, a report indicating any steps and substeps containing definitions of the conditions for interrupting.

13. A method as recited in claim 1,
wherein the records stored in step (a2) include space for a corresponding model step number in a model procedure and an explanation of deviation from the corresponding model step number, and
wherein said method further comprises the step of (d) outputting, upon request, a report indicating the differences between the at least one procedure and the model procedure using the corresponding model step number and the explanation of deviation stored in any of the records in the step file.

14. A method as recited in claim 1,
wherein said storing in step (a1) includes storing a columns indicator, defining a number of columns to be used, in each record in the procedure file, and
wherein said method further comprises the step of (d) outputting, upon request, at least a portion of the document in dependence upon the records stored in steps (a1)–(a3), as edited in step (b), with the number of columns for each step and substep determined by the columns indicator in a corresponding record in the procedure file.

15. A method as recited in claim 14, wherein said storing in step (a) further comprises the step of (a4) storing records containing procedure and step identifiers and notes to the procedure in a note file separate from the procedure, step and substep files.

16. A method as recited in claim 15, wherein step (d) includes outputting each of the notes before the step referenced by a corresponding step identifier, if the request identifies the procedure and the step referenced by a corresponding procedure identifier and the corresponding step identifier, respectively.

17. A method as recited in claim 16, wherein said outputting in step (d) comprises the steps of:
(d1) outputting each step and substep, having the columns indicator defining use of two columns, in a text portion of an output area with space between the two columns, and
(d2) outputting all of the notes and each step and substep, in each procedure having the columns indicator defining use of one column, across substantially all of the text portion of the output area.

18. A method as recited in claim 17, wherein said outputting in steps (d1) and (d2) produces a permanent image in the output area.

19. A method as recited in claim 18, wherein said outputting in steps (d1) and (d2) uses paper to store the permanent image.

20. A method for maintaining in a machine-readable form a document containing hierarchial levels, comprising the steps of:
(a) storing records containing information on items, including records identifying instruments and equipment, in an item file;
(b) storing a number of records in document files separate from the item file, with the records at each hierarchical level in a separate file, at least one record of a first type containing at least one reference to another record, at least one record of a second type containing references to the items, and at least one record of a third type containing a setpoint used with one of the instruments and equipment;
(c) storing records containing document file identifiers and setpoint identifiers in a setpoint reference file separate from the document files;
(d) editing the records stored in step (a);
(e) resolving all references to other records automatically when said editing includes a change in record sequence;
(f) scanning each record, after editing thereof is completed in step (d), for changes in the setpoint stored in the at least one record of the third type; and
(g) modifying the records stored in step (c) in dependence upon changes detected by said scanning in step (f) and any changes in the record sequence of the document files due to addition and deletion of records; and
(h) storing records containing the setpoint identifiers and a description of the setpoint corresponding to each in a setpoint description file separate from the document files, the item file and the setpoint reference file, each of the setpoint identifiers in the setpoint description file having a unique value within the setpoint description file and corresponding to at least one of the setpoint identifiers in the setpoint reference file.

21. A method as recited in claim 20, further comprising the steps of:
(i) outputting, upon request, at least a portion of the document in dependence upon the records stored in step (a) as edited in step (b);
(j) outputting, upon request, a report indicating records in the document files containing reference to setpoints; and
(k) outputting, upon request, a setpoint description report describing at least some of the setpoints used with the instruments and equipment referenced in the document files.

22. A method, performed by a computer system, for maintaining in a machine-readable form a set of procedures for operating equipment, comprising the steps of:
(a) storing procedure records in a procedure file, each of the procedure records including a procedure identifier and procedure text summarizing the procedure;

(b) storing step records in a step file, each of the step records including a corresponding procedure identifier, a step identifier and space for a step description;

(c) storing substep records in a substep file, each of the substep records including a corresponding step identifier, the corresponding procedure identifier associated with the corresponding step identifier, a substep identifier and substep text;

(d) storing notation records in a notation file, each referencing one of the procedure records and one of the step records using the procedure identifier and the step identifier thereof, respectively, and each containing notation text related thereto;

(e) storing exit condition records in an exit condition file, each exit condition record containing an exit condition and the procedure identifier, the step identifier and, if applicable, the substep identifier, of one of the step and substep records referencing the exit condition therein;

(f) storing equipment records in an equipment file, each equipment record containing an equipment identifier and the procedure identifier, the step identifier and, if applicable, the substep identifier, of one of the stp and substep records referencing the equipment identifier therein;

(h) storing setpoint records in a setpoint reference file, each setpoint record containing a setpoint identifier and the procedure identifier, the step identifier and, if applicable, the substep identifier, of one of the step and substep records referencing the setpoint identifier therein;

(i) editing one of the step records; and (j) modifying all references in any record stored in steps (a)–(h) affected by said editing in step (i) when said editing includes one of addition and deletion of one of the step records.

23. A method, performed by a computer system, for maintaining a set of procedures for operating equipment, comprising the steps of:

(a) storing procedure records in a procedure file, each of the procedure records including a procedure identifier and procedure text summarizing the procedure;

(b) storing step records in a step file, each of the step records including a corresponding procedure identifier, a step identifier and space for a step description;

(c) storing substep records in a substep file, each of the substep records including a corresponding step identifier, the corresponding procedure identifier associated with the corresponding step identifier, a substep identifier and substep text, said storing in steps (b) and (c) each including (1) delimiting any of the exit conditions referenced therein using a first delimiter set;

(2) delimiting any of the equipment identifiers referenced therein using a second delimiter set;

(3) delimiting any of the setpoint identifiers referenced therein using a third delimiter set;

(4) indicating any internal references to another step by delimiting the step identifier thereof using a fourth delimiter set (d) storing notation records in a notation file, each referencing one of the procedure records and one of the step records using the procedure identifier and the step identifier thereof, respectively, and each containing notation text related thereto;

(e) storing exit condition records in an exit condition file, each exit condition record containing an exit condition and the procedure identifier, the step identifier and, if applicable, the substep identifier, of one of the step and substep records referencing the exit condition therein;

(f) storing equipment records in an equipment file, each equipment record containing an equipment identifier and the procedure identifier, the step identifier and, if applicable, the substep identifier, of one of the step and substep records referencing the equipment identifier therein;

(h) storing setpoint records in a setpoint reference file, each setpoint record containing a setpoint identifier and the procedure identifier, the step identifier and, if applicable, the substep identifier, of one of the step and substep records referencing the setpoint identifier therein;

(i) editing one of the step records; and (j) modifying all references in any record stored in steps (a)–(h) affected by said editing in step (i) when said editing includes one of addition and deletion of one of the step records, including the steps of:

(j1) automatically incrementing the step identifier of all of the step records containing the corresponding procedure identifier of and following each step record added in said editing in step (i), (j2) automatically incrementing the step identifier in the internal references for all of the step identifiers incremented in step (j1), (j3) automatically decrementing the step identifier of al of the step records containing the corresponding procedure identifier of and following each step record deleted in said editing in step (i), and (j4) automatically decrementing the step identifier in the internal references for all of the step identifiers decremented in step (j1).

24. A method as recited in claim 23, wherein said storing in step (b) includes storing, in at least one of the step records, a file identifier of an associated graphics file, and wherein said method further comprises the steps of:

(k) storing at least one graphics file referenced in a corresponding step record;

(l) outputting, upon request, at least part of one procedure in dependence upon the records stored in steps (a)–(d); and (m) automatically outputting a graphical representation of data stored in the graphics file when the corresponding step record is output in step (k).

* * * * *